United States Patent
Bresciani et al.

(10) Patent No.: US 6,279,351 B1
(45) Date of Patent: Aug. 28, 2001

(54) METHOD AND APPARATUS FOR MAKING GLASS AND PARTICULARLY CERAMIC FRITS

(75) Inventors: Andrea Bresciani, Faenza; Pierugo Acerbi, Imola, both of (IT)

(73) Assignee: Sacmi Cooperativa Meccanici Imola S.c.r.l., Imola (IT)

( * ) Notice: Subject to any disclaimer, the term of this patent is extended or adjusted under 35 U.S.C. 154(b) by 0 days.

(21) Appl. No.: 09/365,397

(22) Filed: Aug. 2, 1999

(30) Foreign Application Priority Data

Aug. 6, 1998 (IT) ............................................. BO98A0489

(51) Int. Cl.[7] ......................................................... C03B 3/00
(52) U.S. Cl. ....................... 65/135.9; 65/136.1; 65/136.3; 65/17.2; 65/21.1; 65/21.5; 65/335; 65/347; 451/33; 451/35
(58) Field of Search .......................... 65/335, 347, 135.9, 65/136.1, 136.3, 17.2, 21.1, 21.5; 451/33, 35

(56) References Cited

U.S. PATENT DOCUMENTS

| | | | |
|---|---|---|---|
| 2,271,845 | * | 2/1942 | Parsons . |
| 2,634,555 | * | 4/1953 | Henry et al. . |
| 3,065,090 | * | 11/1962 | Hopkins . |
| 3,542,534 | * | 11/1970 | Yamamoto . |
| 3,788,832 | * | 1/1974 | Nesbitt et al. . |
| 3,798,018 | | 3/1974 | Paridon et al. . |
| 4,184,861 | * | 1/1980 | Erickson et al. . |
| 4,225,332 | * | 9/1980 | Tsay . |
| 4,826,521 | * | 5/1989 | Wiechmann et al. . |

FOREIGN PATENT DOCUMENTS

| | | |
|---|---|---|
| 94237 | 12/1972 | (DE) . |
| 112638 | 4/1975 | (DE) . |
| 122620 | 10/1976 | (DE) . |
| 3726832 | 2/1989 | (DE) . |

OTHER PUBLICATIONS

Perry et al., Perry's Chemical Engineers' Handbook, 6th Ed., pp. 6–6 to 6–7, 6–10 to 6–13, 1984.*

* cited by examiner

Primary Examiner—Michael P. Colaianni
(74) Attorney, Agent, or Firm—Guido Modiano; Albert Josif; Daniel O'Byrne

(57) ABSTRACT

A method for making glass and particularly ceramic frits, comprising the steps of:
  introducing in a wet grinding unit, after a metering step according to chosen proportions, materials which constitute a mixture to be melted, to produce a slurry;
  screening and collecting said slurry in a storage tank;
  introducing the collected slurry in a melting furnace to make a liquid component of the slurry evaporate; and
  forming a melted paste of vitreous material, adapted to be converted into a ceramic frit.

6 Claims, 2 Drawing Sheets

METHOD AND APPARATUS FOR MAKING GLASS AND PARTICULARLY CERAMIC FRITS

BACKGROUND OF THE INVENTION

The present invention relates to a method and an apparatus for making glass and particularly ceramic frits.

Conventional methods for producing glass-like materials, such as sheet glass, bottle glass and ceramic frits, entail feeding the melting furnaces with mixtures of various materials in powder form with controlled particle size and humidity. The raw materials that compose the mixture must be first dry-ground, transferred to the glass-making site, stored and then metered with the aid of machines such as vibrating hoppers or fluids for extraction from the storage silos, screw feeders or belts, dosage chambers mounted on load cells, mixers, and finally conveyed with the aid of a pneumatic conveyance systems. The various steps of this production process have several financial and production-related drawbacks, linked to the dry grinding of the individual raw materials, to the steps for transferring and storing the powders, and to their mixing; theses production plants are further burdened by a high level of management complexity.

SUMMARY OF THE INVENTION

The aim of the present invention is to obviate the above-described drawbacks of the known methods, i.e., to provide a method for making glass which allows reduced costs, higher effectiveness and flexibility in the management of the treatment system.

Within the scope of this aim, an object of the present invention is to carry out the above method with an apparatus which has a simple structure, is relatively easy to provide in practice, safe in use, effective in operation and relatively modest in cost.

This aim, this object and others which will become more apparent hereinafter, are achieved by a method for making glass and particularly ceramic frits, characterized in that it comprises the steps of:

introducing in a wet grinding unit, after a metering step according to chosen proportions, materials which constitute a mixture to be melted, to produce a slurry;

screening and collecting said slurry in a storage tank;

introducing the collected slurry in a melting furnace to make a liquid component of the slurry evaporate; and forming a melted paste of vitreous material, adapted to be converted into a ceramic frit.

The characteristics of the apparatus for performing the glass-making method are defined in the claims.

BRIEF DESCRIPTION OF THE DRAWINGS

Further characteristics and advantages of the present invention will become better apparent and evident from the following detailed description of a method for making glass according to the invention, illustrated only by way of non-limitative example in the accompanying drawings, wherein.

DESCRIPTION OF THE PREFERRED EMBODIMENTS

Figure 1:
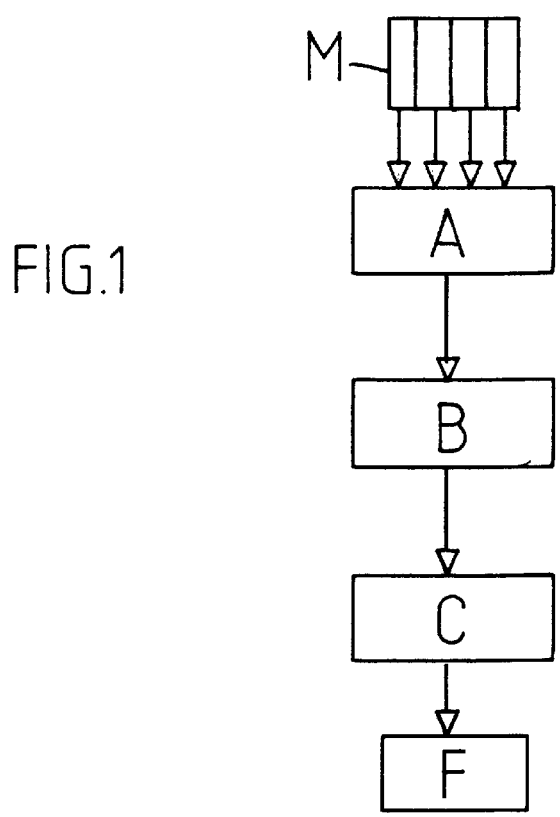
FIG. 1 is a diagram of the steps of the method according to the present invention.
Figure 2:
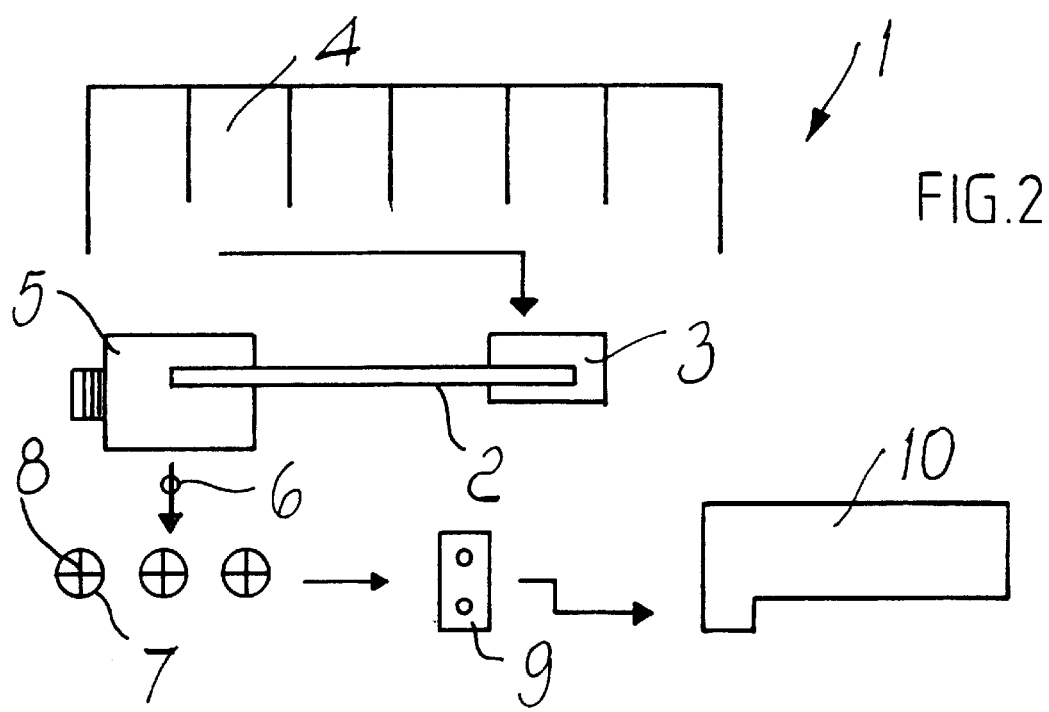
FIG. 2 is a diagram of the apparatus according to the invention for carrying out the method.

With reference to the above figures, 1 generally designates an apparatus for making glass and particularly ceramic frits with the method according to the invention.

The raw materials are stored proximate to the apparatus 1, in a coarse particle size and with their natural moisture content; accordingly, it is necessary to take into account the hygrometric characteristics of each component in calculating the doses to be mixed. Once the doses of raw materials (M) to be used have been established, in the first step (A) of the method, the mixture is composed with conventional methods which use conveyor belts 2, hoppers 3 and weight-decrease load cells to draw the raw materials from storage silos 4, meter them in chosen proportions and convey them to a wet grinding unit 5.

The grinding unit 5 is a known drum mill, of the continuous or discontinuous type, with grinding media made of sintered alumina, which performs wet grinding and produces a slurry with controlled residue.

During the second step (B) of the method, the slurry produced by the mill is filtered by means of a screen 6 and is then accumulated in storage tanks 7 provided with agitation vanes 8. The slurry in the storage tanks has a water content which can vary between 26 and 40% of the weight, a density between 1550 and 1900 g/l, and a viscosity between 1.5 and 3.5 Engler degrees.

In the third step (C) of the method, the slurry is conveyed by means of a pump 9 from the storage tanks 7 to a melting furnace 10, which is of the tank type and in which water evaporation and melting of the materials of the compound occur, producing the frit (F).

Figure 3:
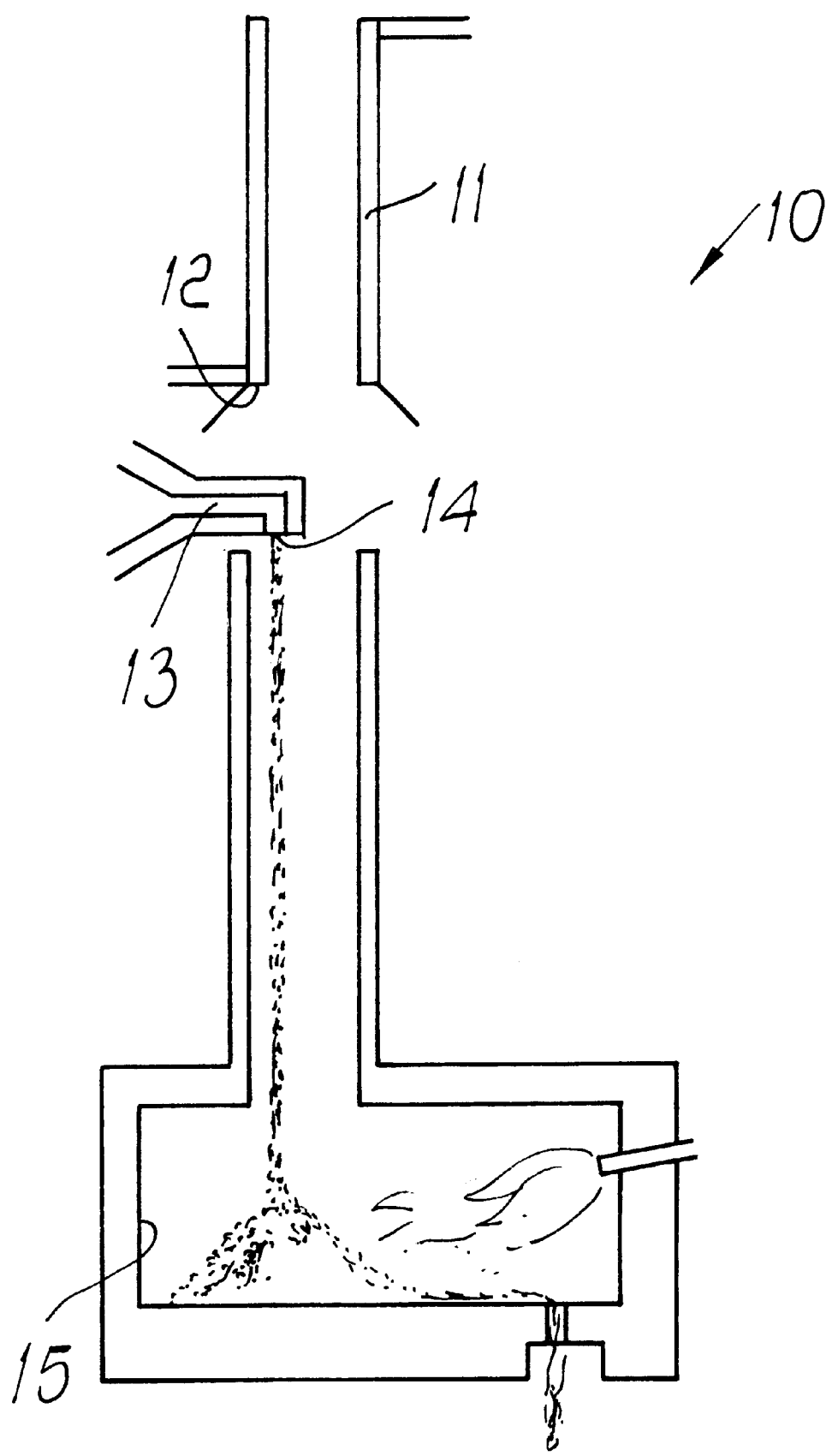
FIG. 3 is a view of a detail of the melting furnace of the apparatus of FIG. 2.

FIG. 3 illustrates a detail of the melting furnace 10. The furnace 10 is provided with a particularly long stack 11 on which there is provided an opening 12 from which a pipe 13 for feeding the slurry into said furnace protrudes. The end part of the pipe 13 has a jacket and is water-cooled in order to prevent it from deteriorating due to the high heat level inside the stack 11; the end of the pipe 13 is provided with a nozzle 14 which is directed downward so as to spray the slurry toward a tank 15 of the furnace 10. The distance that the slurry must cover before depositing on the tank 15 of the furnace allows most of the water present in the slurry to evaporate along the way.

Conveniently, the pipe 13 can be arranged at a higher or lower level along the stack 11, depending on the characteristics of the slurry being produced.

Advantageously, the nozzle 14 can be provided with a single or multiple opening.

Advantageously, if none of the components of the slurry is water-soluble, the slurry can be partially or fully filter-pressed and introduced in the furnace 10 in a plastic form instead of through the nozzle 14.

It should be noted that thanks to the limited size of the particles ground in the drum mill 5, which works with moist material, the amount of heat required to achieve melting is considerably lower than the amount required for conventional dry mixes. In order to ascertain this property of the method, a test was conducted with a ceramic frit thus constituted:

| | |
|---|---|
| Quartz | 34.5% |
| Potassic sodic feldspar | 25.5% |
| Borax pentahydrate | 10.0% |
| Colemanite | 15.0% |
| Alumina | 2.0% |
| Zinc oxide | 3.0% |
| Calcite | 5.0% |
| Dolomite | 5.0% |

After wet grinding, a slurry was obtained which had a 28% water content by weight, a viscosity of 3 Engler degrees and a particle size of less than 63 μm, or with a solid residue through a screen with a net mesh size of 63 μm equal to 0.5% by weight with respect to the solid contained in the slurry.

By introducing a slurry with the above-described characteristics in a furnace provided with a burner having the maximum power of 350,000 kcal/h and a curved tile-like bottom formed in the melting surface, a frit was obtained whose chemical and physical composition is within the standards of those composed with conventional methods. The specific consumption values ascertained by experiments are 2,500 kcal/kg of frit; this consumption is comparable to the typical consumption of conventional productions of this type and can be improved further. Moreover, with this method it is not necessary to include in the energy balance the additional consumption due to the preliminary drying of the components of the mixture to be melted and to the dry grinding.

It has thus been shown that the invention achieves the intended aim and objects.

The invention thus conceived is susceptible of numerous modifications and variations, all of which are within the scope of the inventive concept.

All the details may also be replaced with other technically equivalent ones.

In practice, the materials employed, as well as the shapes and the dimensions, may be any according to requirements without thereby abandoning the scope of the protection of the appended claims.

The disclosures in Italian Patent Application No. BO98A000489 from which this application claims priority are incorporated herein by reference.

What is claimed is:

1. A method for making glass and particularly ceramic frits, comprising the steps of:

introducing in a wet grinding unit, after a metering step according to chosen proportions, raw materials having a course particle size and natural moisture content and which have not been preliminarily dried or ground which constitute a mixture to be melted, and performing wet grinding unit in said wet grinding unit of said raw materials to grind said raw materials into ground particles of limited size to produce a slurry;

screening and collecting said slurry in a storage tank;

introducing and collected slurry in a melting furnace to make a liquid component of the slurry evaporate; and forming a melted paste of vitreous material, adapted to be converted into a ceramic frit.

2. The melting method according to claim 1, wherein said slurry is composed of a suspension of heterogeneous solid articles in an aqueous solution containing solutes of different kinds.

3. The melting method according to claim 1, wherein said slurry is constituted by solid materials whose particle size is between 5 and 100 μm and water.

4. The melting method according to claim 3, wherein said slurry has a water content between 26 to 40 percent by weight.

5. The melting method according to claim 4 wherein said slurry has a viscosity between 1.5 and 3.5 Engler degrees.

6. The melting method according to claim 5 wherein said slurry has density between 1550 and 1900 g/l.

\* \* \* \* \*